(12) United States Patent
Eyre

(10) Patent No.: US 7,475,036 B2
(45) Date of Patent: Jan. 6, 2009

(54) COMPUTER WEB-BASED AUCTION PLATFORM

(75) Inventor: Ethan B. Eyre, Rancho Cucamonga, CA (US)

(73) Assignee: Areun, Inc., Rancho Cucamonga, CA (US)

( * ) Notice: Subject to any disclaimer, the term of this patent is extended or adjusted under 35 U.S.C. 154(b) by 1159 days.

(21) Appl. No.: 10/254,949

(22) Filed: Sep. 24, 2002

(65) Prior Publication Data

US 2003/0105705 A1   Jun. 5, 2003

Related U.S. Application Data

(60) Provisional application No. 60/324,394, filed on Sep. 24, 2001.

(51) Int. Cl.
*G06Q 40/00* (2006.01)
(52) U.S. Cl. ........................................... 705/37
(58) Field of Classification Search ................ None
See application file for complete search history.

(56) References Cited

U.S. PATENT DOCUMENTS

| | | | |
|---|---|---|---|
| 5,794,219 A * | 8/1998 | Brown ........................ | 705/37 |
| 5,835,896 A | 11/1998 | Fisher et al. | |
| 5,855,008 A | 12/1998 | Goldhaber et al. | |
| 6,012,045 A | 1/2000 | Barzilai et al. | |
| 6,202,051 B1 | 3/2001 | Woolston | |
| 6,230,146 B1 | 5/2001 | Alaia et al. | |
| 6,243,691 B1 * | 6/2001 | Fisher et al. .................. | 705/37 |
| 6,266,651 B1 | 7/2001 | Woolston | |
| 6,269,343 B1 | 7/2001 | Pallakoff | |
| 6,847,939 B1 * | 1/2005 | Shemesh ...................... | 705/26 |
| 7,058,602 B1 * | 6/2006 | La Mura et al. .............. | 705/37 |
| 2001/0032175 A1 * | 10/2001 | Holden et al. .................. | 705/37 |
| 2001/0039528 A1 | 11/2001 | Atkinson et al. | |
| 2001/0056383 A1 * | 12/2001 | Shuster ........................ | 705/27 |
| 2002/0052828 A1 | 5/2002 | Ausubel | |
| 2002/0082973 A1 * | 6/2002 | Marbach et al. .............. | 705/37 |
| 2003/0105705 A1 * | 6/2003 | Eyre ........................... | 705/37 |
| 2003/0220867 A1 * | 11/2003 | Goodwin et al. .............. | 705/37 |

\* cited by examiner

*Primary Examiner*—Hani Kazimi
*Assistant Examiner*—Michael R Zecher
(74) *Attorney, Agent, or Firm*—Knobbe, Martens, Olson & Bear LLP

(57) ABSTRACT

A computer auction platform that incorporates a novel concept of virtual Internet property ownership to promote the platform, increase listings and customer base. Virtual property owners may be entitled to receive a portion of the transaction revenue generated from auctions that originate from within a predefined geographic region. Virtual property owners may also have physical locations placed within the geographic region to provide escrow service between buyers and sellers. The central location may also provide assistance for those who do not have access to computers to list or bid on items on the platform.

19 Claims, 7 Drawing Sheets

302 — Virtual Property List (Index 1.0)

| | |
|---|---|
| COUNTRIES: | United States (All 50 States) |
| VIRTUAL INTERNET PROPERTIES: | 2996 properties |
| PROPERTY POPULATION RANGES: | 10,000 to 7,405,500 (NYC) |

304 — Virtual Property List (Index 1.1)

| STATE | Population | Counties | Zones | Zips | Dup | Total | Elite | Metro | Classic | Civic | Capital | Basic | Neutral |
|---|---|---|---|---|---|---|---|---|---|---|---|---|---|
| Pennsylvania | 12,394,537 | 67 | 6 | 2225 | 7 | 1822 | 1 | 1 | 6 | 13 | 297 | 1011 | 493 |
| New York | 19,080,836 | 58 | 7 | 2227 | 3 | 1618 | 3 | 3 | 7 | 21 | 326 | 1002 | 256 |
| Texas | 21,197,598 | 254 | 11 | 2683 | 13 | 1481 | 3 | 3 | 18 | 27 | 279 | 890 | 261 |
| Illinois | 12,538,306 | 102 | 6 | 1597 | 2 | 1300 | 1 | 0 | 7 | 17 | 241 | 901 | 133 |
| California | 34,298,829 | 58 | 15 | 2680 | 4 | 1236 | 3 | 6 | 40 | 105 | 358 | 557 | 167 |
| Ohio | 11,412,395 | 88 | 6 | 1472 | 7 | 1072 | 0 | 4 | 4 | 11 | 227 | 568 | 258 |
| Missouri | 5,609,344 | 115 | 5 | 1192 | 3 | 960 | 1 | 1 | 2 | 9 | 95 | 765 | 87 |
| Iowa | 2,974,966 | 99 | 5 | 1071 | 0 | 944 | 0 | 0 | 2 | 6 | 53 | 833 | 50 |
| Michigan | 9,983,620 | 83 | 6 | 1167 | 1 | 887 | 0 | 2 | 7 | 23 | 201 | 537 | 117 |
| Virginia | 7,164,642 | 136 | 5 | 1259 | 23 | 851 | 0 | 2 | 9 | 14 | 100 | 576 | 150 |
| Kentucky | 4,083,997 | 120 | 4 | 1016 | 0 | 843 | 0 | 1 | 1 | 2 | 95 | 614 | 130 |
| West Virginia | 1,817,386 | 55 | 4 | 930 | 1 | 826 | 0 | 0 | 0 | 3 | 33 | 587 | 203 |
| Minnesota | 4,990,792 | 87 | 4 | 1036 | 12 | 813 | 1 | 1 | 0 | 4 | 81 | 686 | 40 |
| North Carolina | 8,193,391 | 100 | 4 | 1087 | 3 | 763 | 0 | 1 | 6 | 17 | 176 | 428 | 135 |

306 — Virtual Property List (Index 1.2)  308

| St | Sym | # | Virtual Property | Population | Zip | St |
|---|---|---|---|---|---|---|
| LA | ABBE | 1 | Abbeville | 24,879 | 2 | NJ |
| SC | ABBV | 1 | Abbeville | 15,684 | | NC |
| SD | ABER | 1 | Aberdeen | 28,949 | 2 | IL |
| WA | ABEE | 1 | Aberdeen | 24,510 | | TX |
| MD | ABRD | 2 | Aberdeen | 20,195 | | NJ |
| MS | ABDN | 2 | Aberdeen | 12,250 | | MI |
| NC | ABRN | 1 | Aberdeen | 9,242 | | NY |
| TX | ABL | 17 | Abilene | 121,822 | 10 | CA |

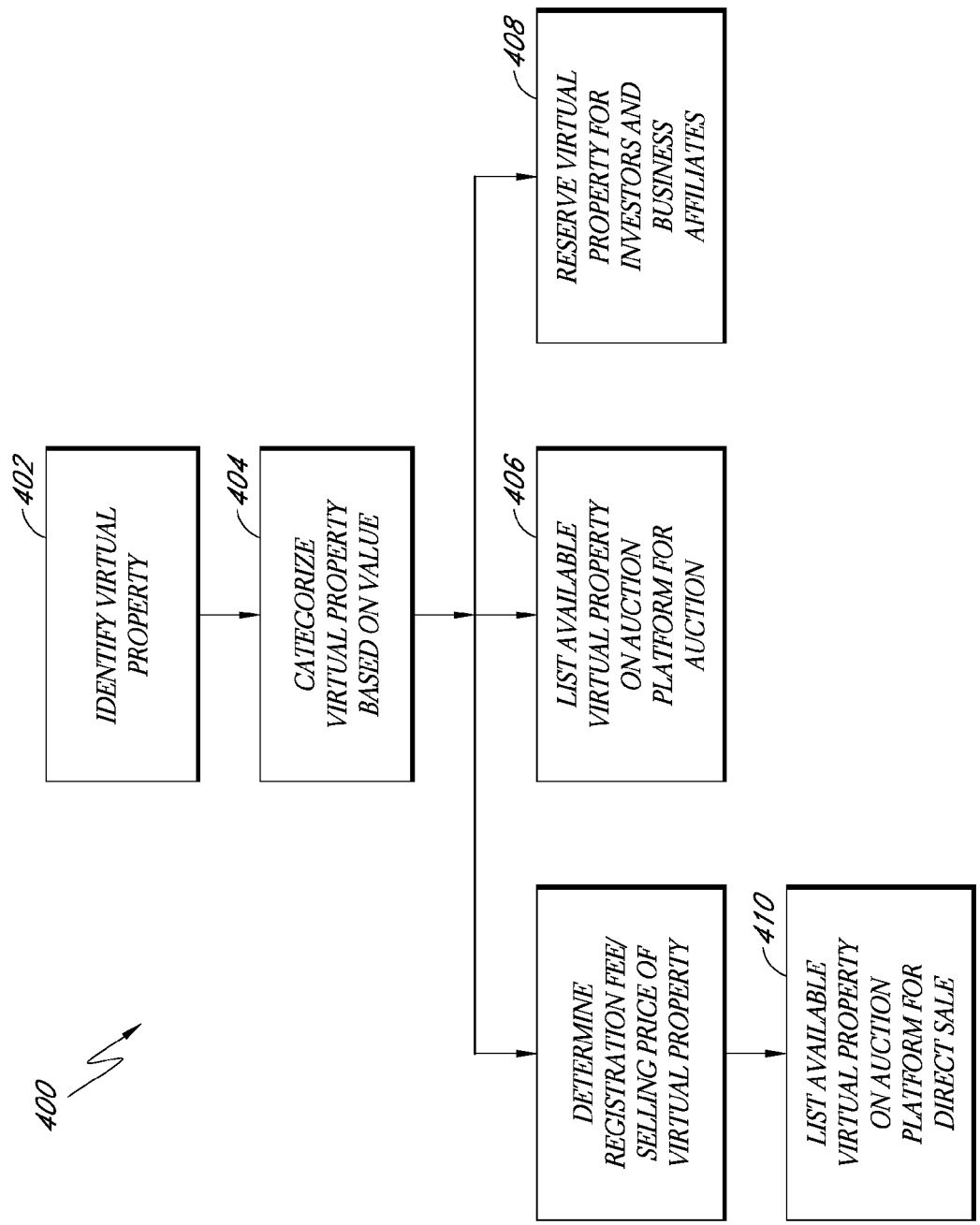

COMPUTER WEB-BASED AUCTION PLATFORM

RELATED APPLICATION

This application claims priority to U.S. Provisional Patent Application No. 60/324,394, filed Sep. 24, 2001, which is incorporated by reference herein in its entirety.

BACKGROUND OF THE INVENTION

1. Field of the Invention

This invention relates generally to the field of online auctions and, more particularly to systems and methods for deploying an online auction platform with a virtual property ownership incentive program.

2. Description of the Related Art

In recent years, online auctions have gained widespread popularity and acceptance. Currently, bidding for millions of items of virtually limitless variety is conducted through an ever-increasing number of online auction sites. These auction sites offer consumers a convenient way to access an endless range of merchandise available from around the world which can be readily searched, viewed, and purchased online. Furthermore, online auction sites give sellers a readily accessible presence or "storefront" from which to market items to a very large population of potential buyers.

As the popularity of this method of commerce continues to grow, so too does the number of sites and companies which offer online auctions. Presently, there are many different online auction sites which have begun to overlap and compete with one another in terms of listings (including the number and types of merchandise available) and customer base (the number of people viewing and bidding on available goods). This increase in competition has the potential to dilute the effectiveness of the online auction format as the resources vital to the success of online auctions have become widely distributed in a manner that makes it less convenient and more difficult for consumers to access.

A further development in the online auction marketplace is that a select few online auction sites currently predominate in terms of merchandise availability and customer base. Smaller companies wishing to conduct online auctions often find it difficult to compete with larger, more widely accepted companies. To this end, some online auction sites have attempted to gain a larger share of the consumer market by offering reduced fees for listing and auctioning merchandise. This approach has been met with only limited success. People generally like to participate in online auctions through a few well-known and established auction sites. Even the lure of "free" listings and commissions has not been able to induce buyers and sellers to change their listing, bidding, and purchasing behavior to any great extent. As a result, there are a select few auction sites that continue to monopolize the marketplace. There is little if any chance for this trend to change in the absence of a significant incentive that would provide the necessary stimulus to induce both buyers and sellers to consider using other less well-known online auction sites.

A further problem which arises from the current trends in online auctioning is that buyers and sellers receive only limited benefits from using a particular auction site. Proceeds from listing fees and closing costs are typically collected by the online auction site and this money is lost from the transaction between the buyer and the seller. Aside from the sale or purchase of the actual merchandise, the buyer and seller do not receive any additional benefit in the form of compensation from the online auction site for their business. Lacking any true incentive, a given auction site can find their buyers and sellers leaving for more well-known auction sites which offer essentially the same services. In the online auction site marketplace, there has not been devised a method by which to establish firm loyalty between the buyers, sellers, and the particular online auction site.

Moreover, while the online auction market is a proven business model, there are still a large number of people who are hesitant to participate in online auctions for the fear of becoming victims to fraudulent schemes. The anonymity afforded by the Internet has given rise to various forms of scams that have been particularly prevalent in online auction environments. For example, sellers can disappear after receiving payment from the buyer without delivering the merchandise. Similarly, buyers can use fraudulently acquired credit cards or checks to purchase items and then disappear after receiving the item. Additionally, since most online sales transactions are conducted without the buyer having seen the actual merchandise, buyers sometimes find themselves receiving an item that is inferior to what was described to them by the seller. These types of concerns associated with the online auction environment have kept many people on the sideline who would otherwise like to take advantage of the broad reach and convenience of online auctions to buy and sell merchandise.

Moreover, people who do not have access to computers or who are not familiar with how to navigate through an online auction site are also precluded from taking advantage of online auctions. Although computers and the Internet have become a ubiquitous part of modern life, there are still a large number of people who do not own computers or are computer-illiterate. Consequently, these people cannot benefit from the advantages of participating in online auctions and must rely on traditional channels in selling or buying goods.

From the foregoing, it can be appreciated that there is a need for an incentive program that is designed to enable smaller online auction sites to more effectively promote themselves and compete with the few online auction companies that currently dominate the marketplace. To this end, there is a need for an effective online auction business model that creates trust and loyalty between buyers, sellers, and the online auction site to ensure stability of the population base served by the online auction site. Moreover, there is also a need for an effective method of enabling people who do not have access to computers or are computer illiterate to take advantage of the opportunities online auctions provide.

SUMMARY OF THE INVENTION

In one aspect, the preferred embodiments of the present invention provide a novel method of conducting an on-line auction. The method comprises organizing a geographic area into a plurality of regions and transferring virtual property ownership rights of the regions to a plurality of owners. The method further comprises establishing an auction platform that is accessible to a plurality of sellers and a plurality of buyers via a distributed computer network throughout the geographic area wherein the plurality of sellers can list items for sale and wherein the plurality of buyers can place bids on the items listed for sale. Moreover, the method comprises auctioning at least one item listed by the seller to a buyer who indicates a willingness to pay the highest price for the item listed for sale and distributing a portion of the proceeds from the transaction to one of the plurality of virtual property owners based upon the relationship between the buyer or the seller and the region of the geographic area corresponding to the virtual property.

In one embodiment, transferring virtual ownership rights to the plurality owners comprises auctioning the rights via the auction platform to the owners. In another embodiment, the method further comprises accumulating a portion of each auction transaction conducted on the platform into a fund wherein distributing portions of proceeds to the virtual property owners comprises periodically distributing proceeds from the fund to the virtual property owners. Preferably, the method further comprises determining the seller's location and assigning the proceeds to the virtual property owners based upon the seller's location. In another embodiment, the method further comprises soliciting feedback from the buyer about the transaction and using the feedback as a basis for distributing the proceeds from the fund to the sellers so as to provide an incentive to the sellers to improve the transaction between the seller and the buyer. In yet another embodiment, the method further comprises establishing physical locations within at least some of the plurality of regions, wherein the physical locations provide a place for buyers and sellers to interact with the virtual property owners.

In another aspect, the preferred embodiments of the present invention provide a method of doing an on-line auction business. The method comprises establishing an auction platform that is accessible to a plurality of sellers and a plurality of buyers via a distributed computer network throughout a geographic area wherein the sellers can list items for sale and the buyers can place bids on the items for sale such that a plurality of on-line auction transactions can occur. The method further comprises transferring rights to a plurality of auctioneers a virtual property whereby transactions associated with a geographic region are assigned as an asset of the virtual property rights and distributing proceeds to the auctioneers in response to the successful completion of an on-line auction transaction.

In one embodiment, the method further comprises soliciting feedback from the sellers and the buyers about the transaction and adjusting the distribution of the proceeds from the transaction that is to be provided to the auctioneer based upon the feedback from the buyers or sellers to thereby incentive the auctioneer to improve the transaction. Moreover, the method can also include providing proceeds from a plurality of each transaction to the auction platform to thereby provide a revenue stream to the owner of the platform. Furthermore, transferring rights to the plurality of auctioneers a virtual property right comprises the auction platform selling the virtual property rights to the plurality of auctioneers at a price based on the potential revenue that could be generated by the property or auctioning the property on the platform to the highest bidder for the property.

In yet another aspect, the preferred embodiments of present invention provide a method of generating revenue for an online auction platform. The method comprises creating a plurality of virtual Internet properties associated with the online auction platform, wherein each virtual Internet property comprises the right to collect at least a portion of the proceeds generated from auction transactions conducted within the platform, and distributing the virtual Internet properties to a plurality of entities, wherein each entity pays a fee for the virtual Internet properties, wherein the fee results in revenue for the online auction platform. These and other objects and advantages of the present invention will become more apparent from the following description taken in conjunction with the following drawings.

BRIEF DESCRIPTION OF THE DRAWINGS

FIG. 3 is a schematic overview of an example of a virtual property list;

FIG. 4 is a schematic overview of a method of distributing virtual Internet property ownership;

DETAILED DESCRIPTION OF THE PREFERRED EMBODIMENT

Figure 1:
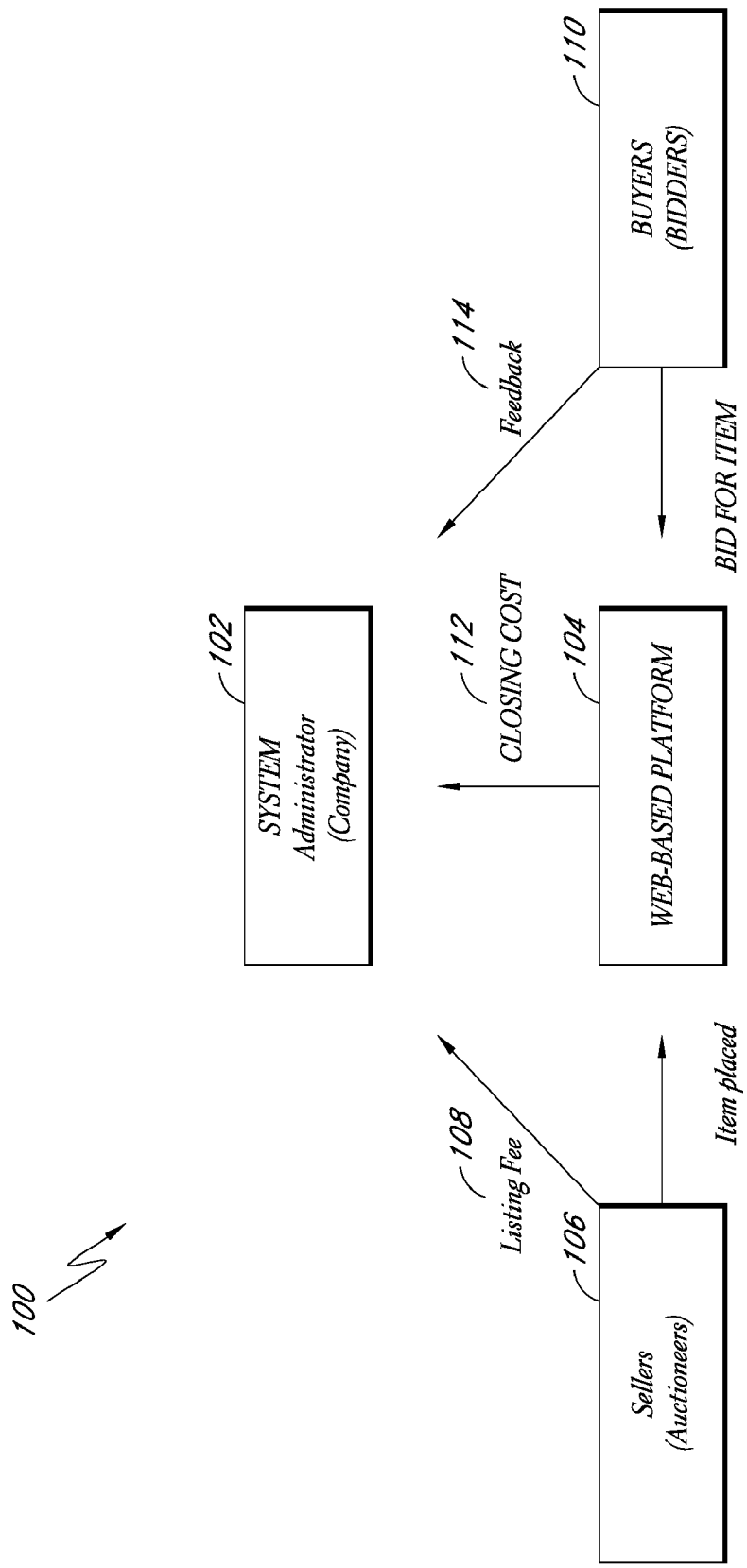
FIG. 1 is a schematic overview of a conventional computer web-based auction system.

Reference will now be made to the drawings wherein like numerals refer to like parts throughout. FIG. 1 is a schematic overview of a conventional computer web-based auction system 100. The system 100 generally comprises a system administrator 102 who creates and operates a web-based platform 104 where goods and services can be auctioned for sale. The system administrator 102 is typically a company or organization that manages and oversees the operation of the auction platform 104. A seller (auctioneer) 106 can list goods or services on the platform 104 by paying the system administrator 102 a listing fee 108. Once the item is listed, buyers (bidders) 110 can bid on the item by accessing the online auction platform 104 via a communications medium such as the Internet.

As FIG. 1 further shows, when an item is successfully sold, the seller 106 pays the administrator 102 a closing cost 112 or commission, which is typically based on the sale price of the item. Buyers 110 can also provide feedback 114 about their overall satisfaction with the transaction and/or seller to the system administrator 102. This feedback 114 is usually posted on the auction website so that it can be used by future buyers as a basis for determining the credibility of a particular seller.

In a conventional auction system as shown in FIG. 1, the revenue generated from listing fees 108 and closing costs 112 are generally directed to the system administrator 102 who manages the auction platform. The actual participants (sellers/buyers) of the auctions typically do not share any part of this revenue regardless of how often they transact with the platform. As such, sellers and buyers do not have a strong incentive to promote a particular online auction platform. In fact, the system administrator 102 is usually the only entity that has any substantial financial incentive to increase the customer base of the platform. Consequently, these conventional auction platforms often experience slow and limited growth.

As will be described in greater detail below, the preferred embodiments of the present invention provide a web-based auction system that utilizes a novel business model to promote the platform, increase listings at the auction site, and establish loyalty between buyers, sellers, and the auction site. In one aspect, the auction system incorporates the inventive concept of virtual Internet property ownership to increase the platform customer base and generate additional revenues for the platform.

Virtual Internet Property

Virtual Internet property ownership is a novel business concept developed to add value to a conventional online auction platform and to provide incentives for entities other than the platform administrator to promote the platform. In one embodiment, virtual Internet property is generally defined as the right or privilege to collect a portion of the transaction revenue generated from online auctions that originate from a selected geographic region or other pre-defined area. In one aspect, the virtual Internet property owner is entitled to a portion of the commissions generated from transactions that originate from within the virtual property's boundaries in a manner similar to a real property owner, such as a mall owner, who may be entitled to a share of the profit of business transactions that take place within the confines of the real property. Like real property, virtual Internet properties can be purchased, sold, auctioned, or otherwise exchanged. In various embodiments, the virtual Internet property ownership associated with a particular platform may be provided to a variety of different entities other than the platform administrator. Hence, the incentive to promote the platform is now distributed amongst a large number of different entities, whose collective effort in increasing the platform customer base is generally more effective than the lone effort of the system administrator.

Figure 2:
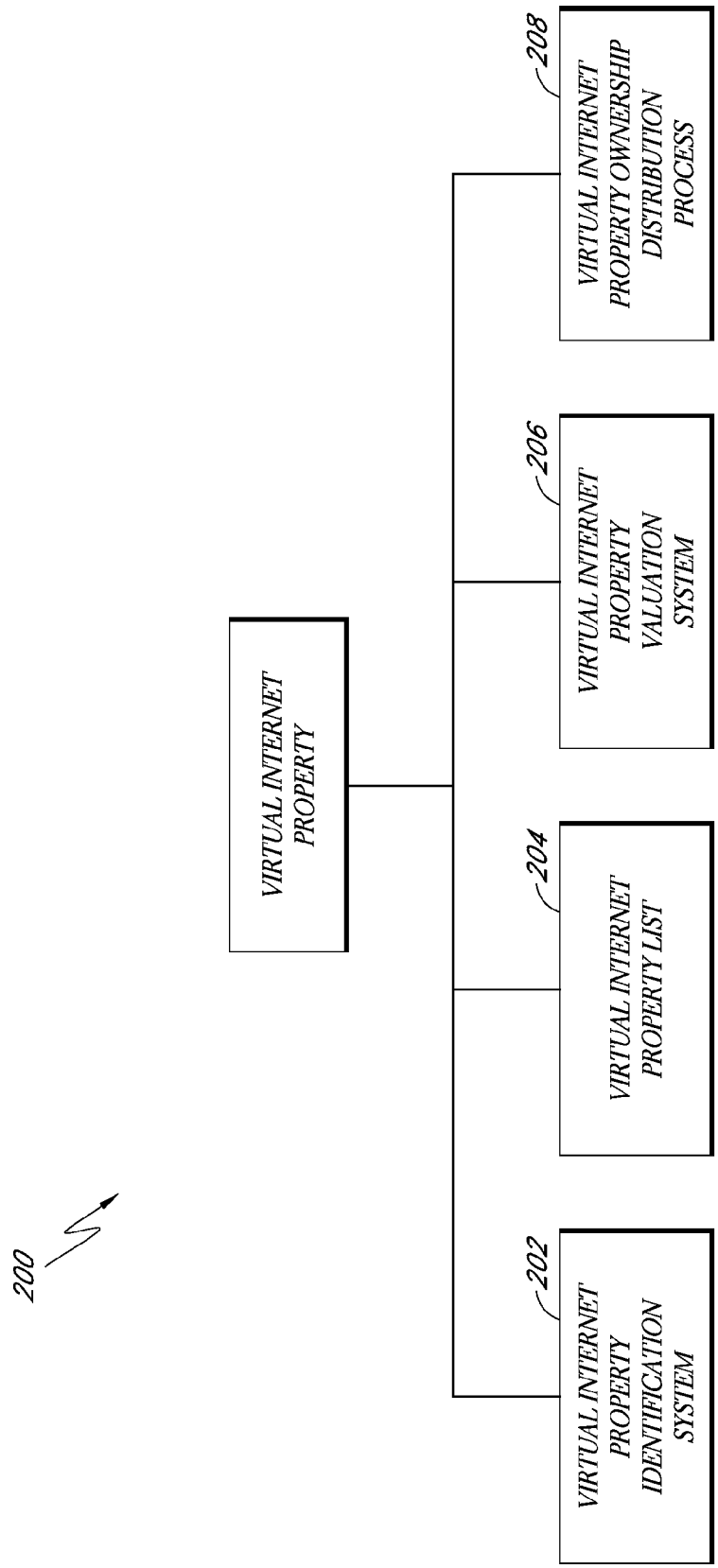
FIG. 2 is a schematic overview of some of the components of a virtual Internet property business model as it is applied to an online auction platform.

FIG. 2 depicts one embodiment of a schematic illustration of a virtual Internet property business model 200 developed for an online auction platform. As shown in FIG. 2, the virtual Internet property business model 200 generally comprises a property identification system 202, a property list 204, a valuation system 206, and a property ownership distribution process 208. Each of these components will now be described in greater detail.

Property Identification System

The virtual Internet property identification system 202 is designed to provide a uniform system of identifying and allocating the virtual properties in a manner that is familiar and easy to understand for most people. In one embodiment, the virtual properties are identified as online cities or towns that approximate geographic locations from which online auction activities may originate. Each virtual Internet property may be desirably associated with a physical location such as a particular city or region of the country that an interested individual may be familiar with. In various embodiments, virtual Internet properties may be referred to as being part of, or corresponding to a place, municipality, capital, megalopolis, metropolis, suburb, county seat, trading center, inner city, downtown, shopping center, district, business or financial district, incorporated town, village, metropolitan area, township, port, civic, community, municipal, an urban area, a small collection of dwellings, hamlet, or other locations describing a populated area where auction related activities may originate from.

In other embodiments, these virtual properties may be associated with actual cities or towns that can be described by characteristics including zip code, location, population, among other distinguishing characteristics. For example, the zip codes designated by the postal service of each country may be used as an identifier for individual virtual Internet properties. Moreover, the boundaries between virtual Internet properties may be correlated with the geographic boundaries defined by the zip codes. As such, each virtual Internet property in the United States may be represented by a numerical value such as a five or nine digit zip code that is used by the U.S. Postal Service to designate the particular geographic area with which the virtual property is associated. Additionally, some virtual properties may be identified by a single zip code while others may be identified by a plurality of zip codes that delineate the boundaries of the virtual property area.

Table 1 illustrates one exemplary distribution of virtual property defined according to the aforementioned principles.

TABLE 1

Virtual Internet Property Identification System

| | ZIP Code | City | State | Population | Mile | County | Area Code | Time Zone |
|---|---|---|---|---|---|---|---|---|
| 1 | 93401 | San Luis Obispo | CA | 27,183 | 0.0 | San Luis Obispo | 805 | Pacific |
| 2 | 93403 | San Luis Obispo | CA | 0 | 1.8 | San Luis Obispo | 805 | Pacific |
| 3 | 93405 | San Luis Obispo | CA | 33,116 | 2.6 | San Luis Obispo | 805 | Pacific |
| 4 | 93406 | San Luis Obispo | CA | 0 | 1.8 | San Luis Obispo | 805 | Pacific |
| 5 | 93407 | San Luis Obispo | CA | 204 | 1.7 | San Luis Obispo | 805 | Pacific |
| 6 | 93408 | San Luis Obispo | CA | 0 | 1.8 | San Luis Obispo | 805 | Pacific |
| 7 | 93409 | San Luis Obispo | CA | 0 | 2.2 | San Luis Obispo | 805 | Pacific |
| 8 | 93410 | San Luis Obispo | CA | 0 | 1.7 | San Luis Obispo | 805 | Pacific |

As shown in Table 1, the virtual Internet properties may be divided and identified by the zip codes of the actual location where auction activities originate. Each zip code in turn may be associated with one or more distinguishing characteristics of the region, including, for example, city, state, population, area, county, area code, time zone or the like. Each of these characteristics can further be used to distinguish the virtual property of the auction platform. For example, Table 1 shows that virtual Internet property #93401 is defined as the right to collect a portion of the commissions generated from all auction activities that may originate from portions of San Luis Obispo covered by U.S. Postal Zip Code 93401. Alternatively, an analogous virtual Internet property can be represented by the number 33,116, which generally corresponds to the estimated population of the geographic area covered by the virtual property. Advantageously, the virtual Internet property identification system utilizes established references to identify and allocate the virtual properties so that the location and boundary of each virtual property can be readily communicated and understood.

Property List

Virtual Internet properties that are available for sale can be communicated via a virtual Internet property list 204. In one embodiment, the virtual Internet property list 204 comprises an index of virtual properties that are positioned for activity. This index of available property may be displayed on the auction website so that prospective owners can access the list to review the properties. In various embodiments, the index comprises a plurality of lists and is arranged such that the first list, which may also be referred to as Index 1.0, contains top level general information as to the availability of property in a particular country while each successive list may provide more location specific and detailed information regarding available properties.

FIG. 3 illustrates portions of an exemplary virtual Internet property list 300. The list 300 is comprised of subindice including: "Index 1.0" 302, "Index 1.1" 304, and "Index 1.2" 306. As shown in FIG. 3, "Index 1.0" 302 contains a top view of the overall availability of virtual properties in the United States. As indicated in "Index 1.0", an exemplary distribution of virtual property results in approximately 2996 virtual Internet properties in the United States that may be available for sale with the population range of the geographic regions covered by these virtual properties residing between approximately 10,000 to 7,405,500. In various embodiments, the top view information provided in "Index 1.0" gives prospective property buyers a synopsis as to the availability of property in a selected county or locality and the population that could potentially generate revenue for the properties. "Index 1.0" further presents information in a consolidated format so that prospective buyers can make a quick determination as to whether they would like to conduct any further searches.

The available properties can be further categorized into the states where they are located as shown in "Index 1.1" 304, which follows "Index 1.0" 302. For example, according to "Index 1.1", approximately 1822 pieces of available virtual property in the state of Pennsylvania may be identified. As is also shown in FIG. 3, "Index 1.2" 306 provides further details by grouping the properties according to the cities where they represent. In various embodiments, each city may be assigned a symbol 308 comprised of four or less letters for ease of reference. The system may be configured such that an individual may enter the symbol 308 of a city and retrieve available properties in that city. Advantageously, the virtual Internet property list 300 may incorporate the virtual property identification system described above to provide an organized zone index depicting territorial boundaries that represent available virtual property locations nationwide. In one aspect, this approach allows people who may be interested in purchasing virtual properties to conveniently and rapidly identify the locality and market that they are interested in without having to search through what may be large volumes of information.

Property Valuation System

In various embodiments, to help prospective buyers determine the fair price of a property, the virtual Internet Property Valuation System provides a systematic approach to determine the value of a selected virtual property. In one aspect, a virtual Internet property's initial value may be based on the number of people that may be expected to conduct online auction activity within the property limits. For example, the properties can be categorized based on the population of the geographic region within the property limits and the value of each property may be based on the category it falls under. In various embodiments, the property categories may include, for example: elite, metro, classic, civic, capital, basic and neutral where each category reflects a characteristic, category or class of desirability.

As shown in "Index 1.1" of FIG. 3, properties that have populations of more than one million people may be listed in an elite group comprising a potentially more desirable property based on revenue potential or auction activity. The remaining properties are structured into 5 sub-level groups based on decreasing population valuations. In one aspect, population statistics may be derived from recent U.S. Census estimates to gain a representative statistical count that may be used to determine the virtual property size. For example, the largest populated property may be New York city and the smallest properties may be defined to have a suitable minimum threshold number of people or potential users associated with them. The elite group may include, for example, the following properties: New York City, Los Angeles, Chicago, Houston, Philadelphia, San Diego, Phoenix, San Antonio, and Dallas. The elite group can be further characterized by their larger population base, more desirable customer base, higher income potential, and/or other such factors. Moreover, ownership of elite properties may be reserved for entities such as large banks, real estate companies, or other organizations or individuals that have the presence and/or resources to adequately promote the auction platform within the selected geographic region.

In another embodiment, a virtual Internet property's initial value may be based on the total value of goods that originated from the property limits and have been auctioned successfully on the platform, hereinafter referred to as "total value goods". This manner of evaluation helps determine the value of a particular virtual property in terms of "total value goods" generated by closing costs and revenue for the platform and virtual property owners. These goods can be tangibles that represent possessions, belongings, lands, assets, holdings, inheritance, capital, equity, investments, goods, earthly possessions, real estate properties, and other resources that can be auctioned via the platform. Moreover, total value goods successfully auctioned on the platform create a market value for each property. In one aspect, the market value represents the productivity for each property in a time period assessed as the virtual property owner may collect a portion for each good successfully auctioned off within property boundaries.

Generally, smaller virtual Internet properties associated with decreased populations or smaller geographic areas will typically generate less total value goods. Larger virtual Internet properties associated with increased population bases will typically have larger total value goods as a result of more auctions that are placed within the property limits. However, it is not always certain that a larger property would outperform a smaller one. Despite its smaller population size, a smaller property may still generate larger total value goods in view of other variables or market conditions. Thus, in one aspect, it is advantageous to utilize population in conjunction with total value goods to determine the value of a particular virtual Internet property.

Property Ownership Distribution Process

In one embodiment, individuals or entities are given an opportunity to own virtual Internet properties on a first come first served basis as availability permits. The properties can be viewed in the property list located on the platform and accessible via a communications medium such as the Internet. Individuals acquiring property from the platform are called virtual property owners. The platform administrator may charge an initial registration fee for each property. This registration fee covers the cost of ownership of the property for a designated period of time. Additionally, a renewal fee may be periodically charged to the owner based upon the market value of the property as determined by the administrator.

In another embodiment, some selected virtual Internet properties may be distributed to investors and pre-registered users. This will help raise capital and promote platform activity before, during and after the platform is completely operational. The remaining properties will be available for ownership during the initial property distribution, which may occur when the platform is online and fully functional. In still another embodiment, an individual or entity may be restricted from owning any more than a threshold number of properties to promote ownership diversity and to provide faster growth for the auction platform. The property ownership may also be allocated to registered users based upon the discretion of the platform administrator. In one aspect, not all properties may be acquired at any given time and, therefore, they may remain on the virtual property list as available.

FIG. 4 illustrates a virtual property distribution method 400 that the system administrator may adopt in effectively distributing virtual Internet property ownership to help ensure that the property owners have the resources suited for promoting the auction platform. As shown in FIG. 4, the method 400 begins with a first step 402 whereby the system administrator identifies and defines the boundaries of the virtual properties associated with the auction platform using the identification system described above. After the properties have been successfully defined and identified, the administrator proceeds with a second step whereby the properties are categorized according to their individual perceived value. Preferably, the properties are evaluated using the above described property valuation method. Subsequent to categorizing the properties based on their value or revenue potential, different methods and channels may be created to sell the properties. The methods selected preferably depend on the value of a particular property.

As shown in FIG. 4, premium or valuable properties that have potential of generating large revenue may be auctioned 406 on the platform rather than sold at a predetermined price. Since there may be a higher demand for premium properties, these properties are more likely to be sold at a higher price when they are auctioned as opposed to being sold at a predetermined price to the first buyer. Moreover, the highest bidder is also likely to be an entity with the largest resources to promote the platform. These properties can auctioned on the platform in a similar manner as other goods and services are being auctioned. For example, information relating to the property can be listed on the auction site and minimum bids, reserves, and other options can also be used as auction parameters. Alternatively, these premium properties can also be reserved for investors or business affiliates who can potentially help in co-branding or cross marketing with the platform. For less valuable properties, the administrator may choose to list them for direct sale at a pre-determined price 410 as shown in FIG. 4.

Advantages of Virtual Internet Property

It will be appreciated that the Virtual Internet Property business model, when incorporated into an online auction platform, desirably provides an additional revenue source for the platform via the sale of these properties. Moreover, the Virtual Internet Property business model may also provide financial incentives for entities other than the system administrator to promote the platform and thus further increase revenues generated from auction transactions. These entities may be geographically diverse with each entity having the ability to influence or increase the number of transactions originating from its respective geographic region. In one aspect, the collective efforts of a group of geographically diverse entities may be more likely to be successful in promoting an online auction platform than the single effort from one source. As it is generally known, promotion by word of mouth from a large group of people in different locations may be more effective than many other forms of advertisement.

Figure 5:
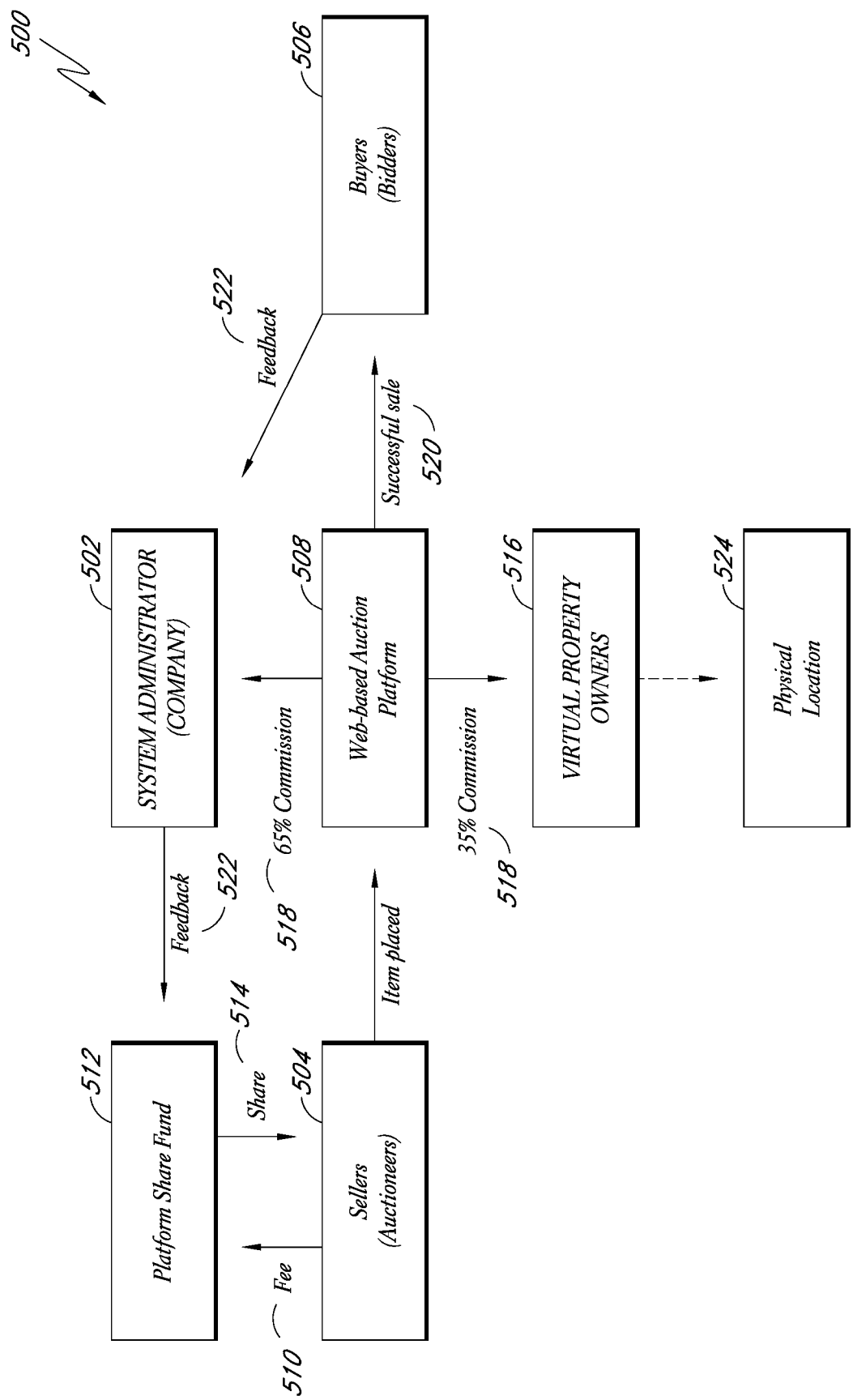
FIG. 5 is a schematic overview of a computer web-based auction platform of one preferred embodiment of the present invention.

In addition to providing incentive for virtual property owners to promote the platform, the online auction system may also reallocate a portion of its transaction revenue back to the sellers and/or buyers as an incentive to encourage their participation. FIG. 5 provides a schematic illustration of an online auction system 500 of one embodiment of the present teachings.

System Administrator

Similar to most conventional web-based auction platforms, the system 500 includes a system administrator 502 that provides the necessary hardware and software to create and operate a web-based auction platform 508 where individuals can list and bid on goods or services via computer terminals in a known manner. The administrator 502 oversees and hosts the activities that take place on the platform, maintains the platform, and manages the entire working environment. To a certain extent, the administrator 502 maintains a degree of control over the platform and can adjust or make changes to the format or structure as necessary.

Auctioneers (Sellers)

FIG. 5 further shows that sellers 504 can place items for online auction via the platform 508. Each seller may be required to be a registered auctioneer on the platform. Moreover, sellers 504 may originate from all over the world to auction items of their choosing. The sellers 504 may be responsible for submitting information for each item, which may include descriptions and photographs. Each seller 504 may also be responsible for paying a listing fee 510 to list goods and services on the auction website.

In one embodiment, instead of directing all revenues generated from the listing fees 510 to the platform administrator 502, at least a portion of the listing fee 510 may be directed to a platform share fund 512. A share 514 of the platform share fund 512 may in turn be reallocated back to the seller 504 and/or buyer 506 under certain conditions as will be described in greater detail below so as to provide an incentive for the seller and buyer to continue to conduct business with the platform.

Bidders (Buyers)

Bidders/buyers 506 place bids on items listed for sale on the platform 508 by the sellers 504. If the buyer 506 is the highest bidder at the end of an auction (meeting applicable minimum bid or reserve requirements), then the bid may be accepted as the final and closing bid by the seller 504. In one aspect, at the close of the auction, the buyer 506 becomes obligated to complete the transaction with the seller 504. Furthermore, the buyers 506 can provide feedback 522 to the system administrator 502 regarding their experience in transacting with a particular seller 504. This feedback 522 is not only used to help other buyers 506 determine the credibility of the seller 504, but also may be a determining factor in the amount of share 514 of the platform share fund 512 that will be reallocated back to the seller 504. Advantageously, this provides additional incentive for sellers to conduct business honestly on the platform, which in turn builds trust between the buyers and the online auction system and improves the user's experience. In yet another embodiment, the seller can provide feedback about their overall satisfaction with the buyer relating to the transaction. A portion of the share fund can be awarded to buyers based on the feedback provided by the sellers.

Virtual Property Owners

As also shown in FIG. 5, the auction system 500 further comprises virtual property owners 516. Virtual property owners 516 may be representative of people or entities that own one or more virtual Internet properties associated with the platform 508. Preferably, the virtual Internet property ownership rights can be purchased and sold in a manner similar to real property, thus creating an additional revenue source for the auction system 500. In one embodiment, the virtual property owners pay the system administrator a registration fee when the property is first acquired and optimally a periodic renewal fee based on the revenue generated by the virtual property.

In various embodiments, one role of the virtual property owner is to build, promote and improve the market value of its property locally. The virtual property owner may be an individual, or individual representing a group of people, or a company or other entity. Teamwork can build a stronger market for an online auction platform. Virtual property owners and the administrator may preferably work together to promote the platform. In one embodiment, marketing can operate at different levels with the administrator performing marketing for example, on the national level while the virtual property owners perform marketing on a local level. Virtual property owners may be required to be auctioneers as well which may help increase platform activity.

In another embodiment, the administrator may have the ability to "repossess" a selected virtual Internet property from a virtual property owner if the renewal fee isn't paid in a timely manner or the condition of sale are not otherwise met. At this point, the repossessed property may be made available for prospective owners and may thus be "repurchased". The virtual property owner may also lose possession or rights to the property if a threshold quantity of auctions is not maintained. Each property may be associated with a threshold quantity of auctions which are required to be held for the virtual property owner to maintain possession of the property. For example, Level 5 property may be defined as requiring a selected number of auction insertions per month, likewise Level 4, Level 3, Level 2 and Level 1 may each require different amounts of auction insertions. The properties may be further governed by separate contracted conditions determined between the owner and the administrator. The virtual property owner may additionally have the right to transfer ownership of their property to other individuals. In one aspect, ownership may be transferred or sold if one or more of the following conditions are met: 1) The property should be owned by the same virtual property owner for a specified period of time. 2) The virtual property owner should maintain the auction placement requirement defined by the threshold quantity. 3) The renewal fee should be paid in a timely manner.

In yet another embodiment, feedback can be solicited from buyers and/or sellers of a transaction regarding their overall satisfaction with the transaction and/or platform as it relates to the virtual property owner's efforts in servicing the buyers/sellers within the geographic region. This feedback can be used to determine the portion of revenue the virtual property owner receives from a particular transaction. The virtual property owners are thus further incentivized to locally promote the platform and improve the on-line auction environment.

Revenue Distribution

Figure 6:
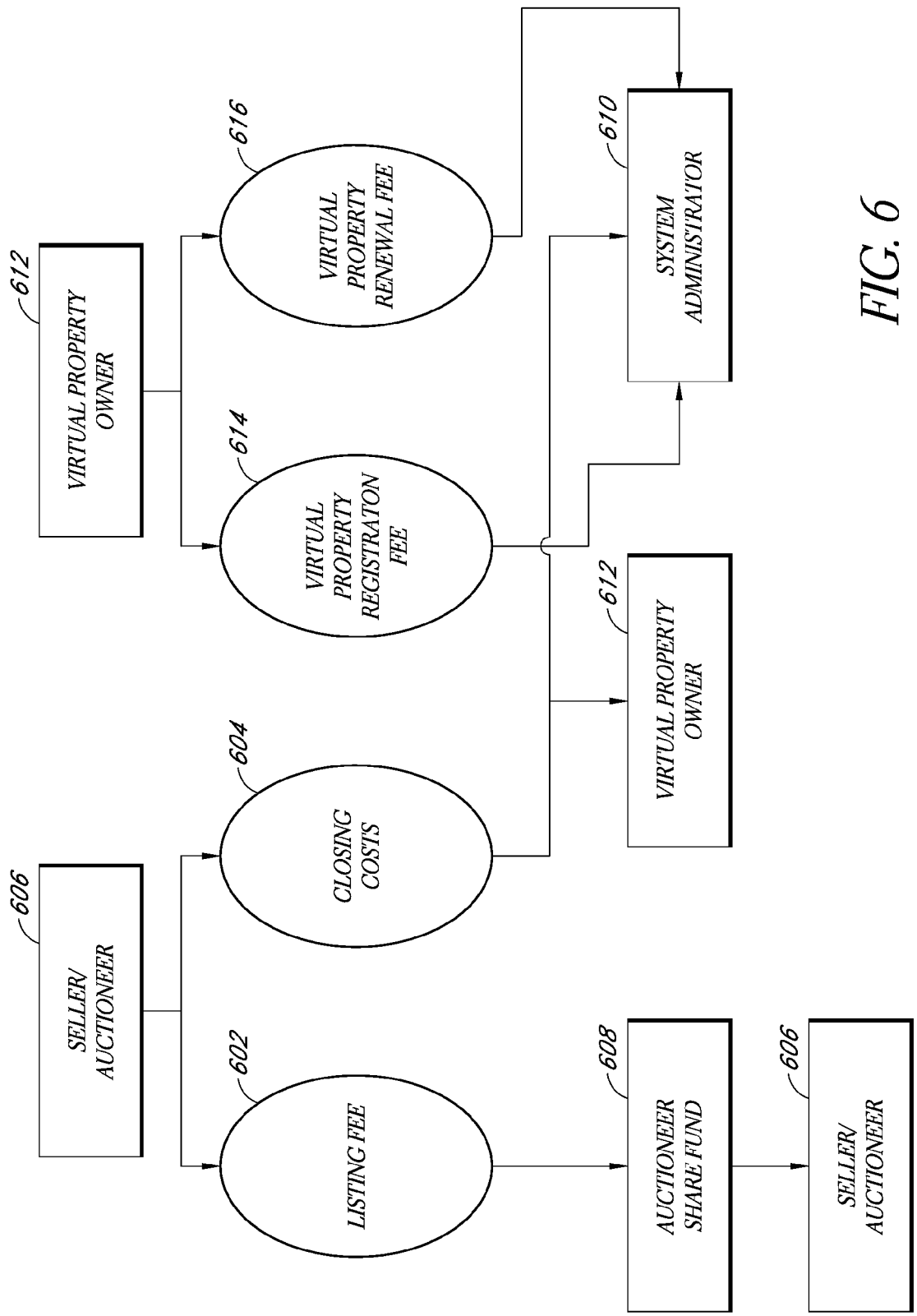
FIG. 6 illustrates one embodiment of a revenue distribution system of the online auction system of FIG. 5.

In one aspect, the platform increases in value each time an auction is placed. At least a portion of this value may be based on the accumulation of listing fees and closing fees. FIG. 6 provides a schematic illustration of a method of distribution of revenue generated by the auction system of the illustrated embodiments. As shown in FIG. 6, the revenue sources comprise revenues generated from listing fees 602 and closing costs 604 which the seller (auctioneer) 606 pays as part of the transaction fee for selling items on the platform. In one embodiment, the listing fees 602 are directed to a platform share fund 608 which is reallocated back to the sellers/auctioneers 606 in a manner so as to encourage their frequent participation. The preferred method in which the listing fees are reallocated back to the sellers will be described in greater detail below. As FIG. 6 further shows, closing costs 604 that are accumulated by successful auctions will be distributed to the administrator 610 and virtual property owners 612, preferably on a monthly basis. Table 2 provides one example of closing cost distribution between the system administrator and virtual property owner of the zone where the transaction originated.

TABLE 2

| Closing Cost Distribution Property Owner Revenue | | |
|---|---|---|
| Goods < or = $50 | 1.625% ADMIN | .875% (VPO) |
| Goods > $50 | 3.25% ADMIN | 1.75% (VPO) |

As shown in Table 2, if the sale price of the item is less than or equal to a predetermined amount, for example $50.00, the seller pays 2.5% of the sale price as closing cost after a successful sale. The administrator receives approximately 65% of the closing cost, which represents about 1.625% of the sale price, and the virtual property owner receives approximately 35% of the closing cost, which represents about 0.875% of the sale price. Similarly, for items with sale price greater than $50.00, the seller pays 5% of the sale price as closing cost after a successful sale. This amount is also distributed between the administrator and the virtual property owner, at an approximate ratio of 65% to 35%. Advantageously, revenue generated from the closing cost 504 may be shared between the systems administrators and virtual property owners, which provides an incentive for virtual property owners to promote the platform so as to increase the overall number of auctions.

Moreover, the administrator may also receive revenue generated from the sale of virtual Internet properties. As shown in FIG. 6, the virtual property registration 614 and renewal fees 616 are directed to the system administrator 610, which provides the administrator with new revenue sources that may not typically be available using conventional auction platforms. Hence, the auction system allows the administrator to not only benefit financially from growth in transaction volume but also from additional sources of revenue derived from virtual Internet properties. Unlike conventional online auction models which normally include three entities: the auctioneer, the bidder, and the platform's host/administrator, the preferred embodiments of the present invention define new entities that work in conjunction with online auctions, including virtual Internet properties and virtual property owners. The incorporation of virtual Internet properties redefine the distribution model that is present with standard online auction platforms. Instead of the platform directing all of the revenue to the administrator as in the standard online auction platform model, this inventive platform distributes the revenue to additional parties, which in turn promotes the growth of the platform resulting in more revenue for all entities.

Figure 7:
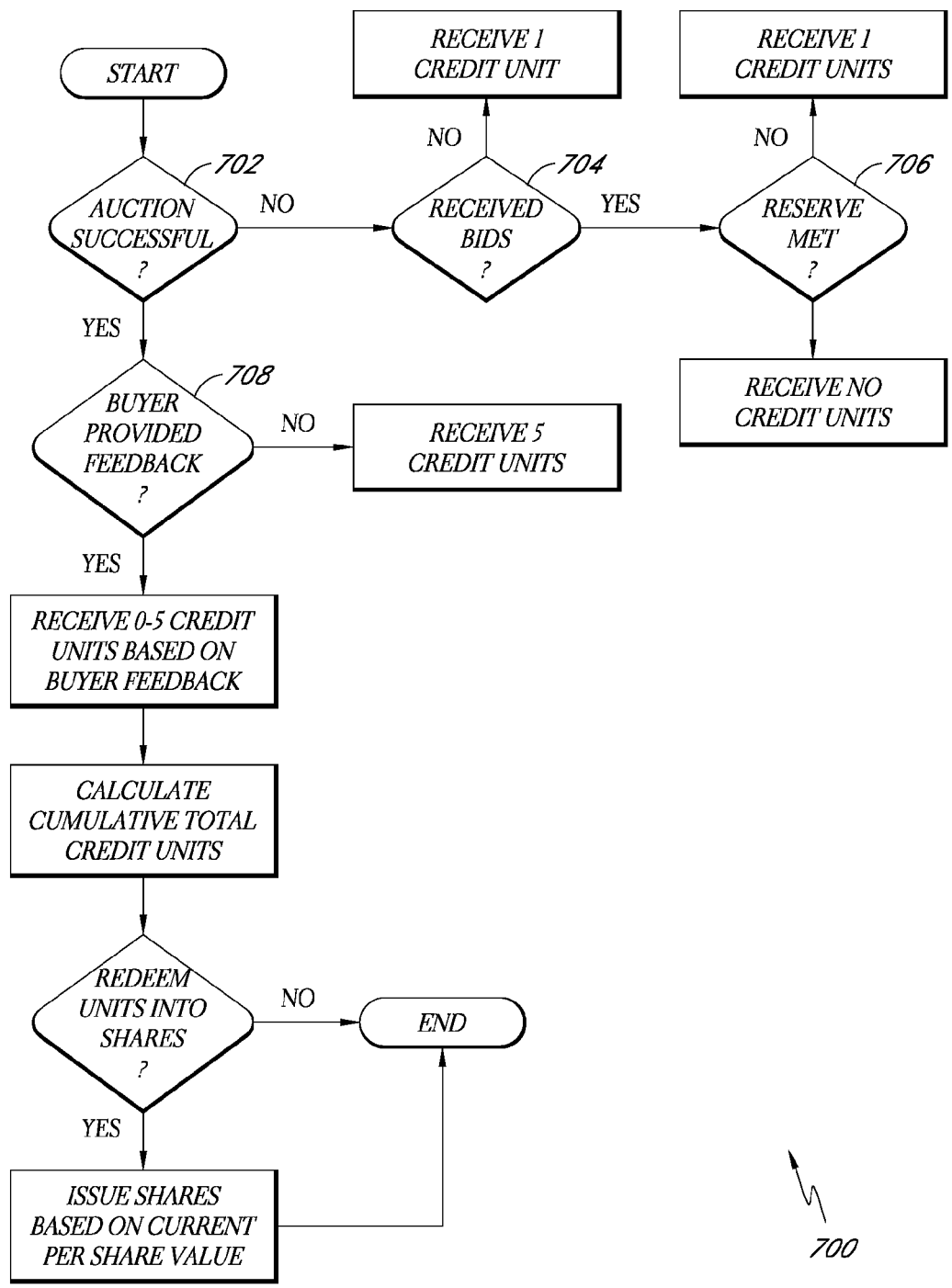
FIG. 7 illustrates a method of rewarding sellers for frequent use of the platform.

FIG. 7 illustrates an exemplary method 700 for reallocating listing fees back to the sellers in a manner so as to provide incentive for the sellers to continue to use the platform in the future. Sellers/auctioneers may receive unit credits or rewards after each successful auction has been conducted. A maximum amount of unit credits, for example 5 units, may be designated as credit earned per auction. As shown in FIG. 7, the method 700 comprises a first step 702 of determining whether the auction was successful. If the auction was not successful, then the method proceeds to a second step 704 to determine whether any bids were received for the seller's listing. If no bids were received, then the seller is rewarded with one credit unit 706. If bids were received, then the method proceeds to a third step to determine whether any reserve was met. If the reserve was not met, then the seller is awarded two credit units. However, if the reserve had been met, then no credit units may be awarded.

As FIG. 7 further shows, if an auction is successful, the method is followed by the step 708 of determining whether any feedback was provided by the buyer. If no feedback was provided, the seller is awarded five credit units. If the buyer responds, the auctioneer can be rewarded with a variable number of credit units to be specified by the buyer, up to the maximum allowable credit units per transaction. If feedback was provided, then the seller may receive any where from zero to five credit units, depending on the feedback. In one embodiment, the buyer can actually designate the number credit units the seller should receive No feedback by the buyer may results in the designation of a fixed number of credit units to be earned by the auctioneer. If the buyer responds, the auctioneer can be rewarded with a variable number of credit units to be specified by the buyer, up to the maximum allowable credit units per transaction. This represents an incentive for the auctioneer to interact favorably with the buyers. After specified periods of time, the shares can be redeemed for cash or various other rewards during a time frame designated by the platform administrator. In one embodiment, the value of the shares may increase or decrease. Furthermore, the platform administrator is able to make changes to the share distribution to supplement market changes. In another embodiment, a portion of the auctioneer share fund may also be directed to buyers/bidders so as to encourage their frequent participation as well. Once an auctioneer has accumulated a designated number of unit credits, the platform allocates one share of the share fund 708 to the auctioneer. The share's value can be based on a number of factors. In one embodiment, the share's value is based on distribution of shares divided by the platform's value. Unsuccessful auctions may also designate a number of credit units to the auctioneer. Likewise, reserve auctions may designate a number of units if unsuccessfully completed.

Physical Locations

In another aspect, as shown in FIG. 5, the auction system may further include actual physical locations 524 or trading centers that are established within the geographic region or area encompassed by a virtual property. These physical locations, preferably referred to as "retail locations", can be established by virtual property owners to enhance their business by serving as a centralized location for sellers and buyers to interact with the virtual property owners. In one embodiment, sellers can bring their goods to the trading center to have the value of the goods authenticated or validated. Likewise, buyers can utilize the trading center as a place to consult with the virtual property owners any concerns they may have regarding a particular transaction. These locations can be coupled with an enterprise-wide IT solution, which will represent real time consumer markets supporting local and national markets. In one embodiment, the locations will be supported by a circular or advertising means that will be distributed periodically through local channels, which will in turn promote local trading activity.

Moreover, the locations may also provide the service of helping those who are not familiar with operating computers to list or bid items on the platform. In one embodiment, the physical location can provide an escrow service whereby sellers deliver the item to the location and buyers submit payments. Advantageously, these physical locations promote a sense of trust to those who may be uncomfortable in dealing with unfamiliar people in faraway places. Many people are skeptical and unsure about transacting with people they do not know. The physical locations, therefore, provide a trusted working model that will help to build customer/user confidence. Moreover, this platform provides an opportunity for those who do not have access to computers to take advantage of online auctions. In one embodiment, the physical locations may also provide postal services such as packaging and shipping of the goods that are being bought and sold.

Although the foregoing description of the invention has shown, described and pointed out novel features of the invention, it will be understood that various omissions, substitutions, and changes in the form of the detail of the apparatus as illustrated, as well as the uses thereof, may be made by those skilled in the art without departing from the spirit of the present invention. Consequently the scope of the invention should not be limited to the foregoing discussion but should be defined by the claims contained herein below.

What is claimed is:

1. A method of conducting an on-line auction, the method comprising:

organizing a geographic area into a plurality of regions, wherein virtual Internet property ownership rights of the geographic area are divided in a manner such that each region has a virtual Internet property ownership right associated thereto;

distributing the virtual Internet property ownership rights of the geographic area to multiple owners, wherein the virtual Internet property ownership rights associated with at least some of the individual regions are owned by different owners;

establishing an auction platform that is accessible to a plurality of sellers and a plurality of buyers via a distributed computer network throughout the geographic area wherein the plurality of sellers can list items for sale and wherein the plurality of buyers can place bids on the items listed for sale;

auctioning at least one item listed by at least one of the plurality of sellers to a buyer who indicates a willingness to pay the highest price for the item listed for sale; and distributing a portion of the proceeds from the transaction to the virtual Internet property rights owners of the region where the transaction is located.

2. The method of claim 1, wherein distributing the virtual Internet property ownership rights of the geographic area to multiple owners comprises auctioning the virtual Internet property ownership rights via the auction platform to multiple owners.

3. The method of claim 1, wherein organizing a geographic area into a plurality of regions comprises organizing the geographic area into regions based on zip codes.

4. The method of claim 3, further comprising accumulating a portion of each auction transaction into a fund and wherein distributing the portion of the proceeds to the plurality of virtual Internet property rights owners comprises periodically distributing proceeds from the fund to the plurality of virtual Internet property rights owners.

5. The method of claim 1, wherein distributing a portion of the proceeds from the transaction to the virtual Internet property rights owner of the region where the transaction is located comprises determining the seller's location and assigning the proceeds to the virtual Internet property rights owner based upon the seller's location.

6. The method of claim 5, further comprising:
soliciting feedback from the buyer about the transaction; and
using the feedback as a basis for distributing the proceeds from the fund to the plurality of sellers so as to provide an incentive to the plurality of sellers to improve the transaction between the seller and the buyer.

7. The method of claim 6, wherein distributing fund to the plurality of sellers comprises distributing a portion of listing fees the platform receives from sellers for listing the items.

8. The method of claim 6, wherein credit units are distributed to the seller for each successful transaction, wherein the number of credit units distributed is based on feedback from the buyer.

9. The method of claim 8, wherein the cumulative credit units can be redeemed for shares in the fund, wherein the value of each share is based on the fund value.

10. The method of claim 4, wherein distributing proceeds from the fund to the plurality of virtual Internet property rights owners comprises distributing about 35% of the proceeds from closing costs received by the platform after a seller successfully sells an item.

11. The method of claim 1, further comprising establishing physical locations where the sellers and the buyers can interact with the virtual Internet property rights owners.

12. A method of doing an on-line auction business, the method comprising:
organizing a geographic area into a plurality of regions, wherein virtual Internet property ownership rights of the geographic area are divided in a manner such that each region has a virtual Internet property ownership right associated thereto:
distributing the virtual Internet property ownership rights of the geographic area to multiple owners, wherein the virtual Internet property ownership rights associated with at least some of the individual regions are owned by different owners;
establishing an auction platform that is accessible to a plurality of sellers and a plurality of buyers via a distributed computer network throughout a geographic area wherein the sellers can list items for sale and the buyers can place bids on the items for sale such that a plurality of on-line auction transactions can occur;
transferring rights to collect proceeds generated from the on-line auction transactions in the geographic area to multiple virtual Internet property rights owners, wherein each virtual Internet property rights owner has a right to collect proceeds generated from transactions associated with a region within the geographic area to which the virtual Internet property rights owner has been assigned;
auctioning at least one item listed by at least one of the plurality of sellers to a buyer who indicates a willingness to pay the highest price for the item listed for sale; and
distributing proceeds to the multiple virtual Internet property rights owners in response to the successful completion of an on-line auction transaction.

13. The method of claim 12, wherein distributing the proceeds to the plurality of virtual Internet property rights owners in response to a successful completion of an on-line auction transaction comprises:
soliciting feedback from the sellers and the buyers about the transaction;
adjusting the distribution of the proceeds from the transaction that is to be provided to the virtual Internet property rights owner based upon the feedback from the buyers and sellers to thereby incentivize the virtual Internet property rights owner to improve the transaction.

14. The method of claim of claim 12, further comprising providing a portion of the proceeds from each transaction to the auction platform to thereby provide a revenue stream to the owner of the auction platform.

15. The method of claim 12, wherein transferring rights to collect proceeds generated from the on-line auction transactions comprises the auction platform selling the rights to collect proceeds generated from the on-line auction transactions in individual regions within the geographic area at a price based on the potential revenue that could be generated from on-line auction transactions in each respective region.

16. The method of claim 12, wherein selling the rights to collect proceeds comprises auctioning the rights via the auction platform.

17. The method of claim 13, further comprising requiring the plurality of virtual Internet property rights owners to provide a periodic payment to the auction platform to thereby provide an additional stream of income to the owner of the auction platform.

18. The method of claim 17, further comprising revoking the right from the virtual Internet property rights owner when the virtual Internet property rights owner fails to provide the periodic payment.

19. The method of claim 16, further comprising:
auctioning the right owned by a first virtual Internet property rights owner to a second virtual Internet property rights owner via the auction platform; and
approving the transfer from the first virtual Internet property rights owner to the second virtual Internet property rights owner only when a percentage of the transaction revenue is provided to the auction platform to thereby provide an additional stream of income to the auction platform.

* * * * *